United States Patent

Visser

[15] 3,677,061

[45] July 18, 1972

[54] ULTRASONIC TEST STANDARD

[72] Inventor: Jan Visser, Elmhursh, Ill.

[73] Assignee: Amsted Industries Incorporated, Chicago, Ill.

[22] Filed: Feb. 10, 1971

[21] Appl. No.: 114,119

[52] U.S. Cl. ............................................................73/1 R
[51] Int. Cl. ....................................G01c 25/00, G01n 29/00
[58] Field of Search ..........................................73/1 R, 1 DV

[56] References Cited

UNITED STATES PATENTS

| | | | |
|---|---|---|---|
| 3,491,580 | 1/1970 | Fornerod | 73/1 R |
| 3,531,977 | 10/1970 | Chaskelis et al. | 73/1 R |

Primary Examiner—Louis R. Prince
Assistant Examiner—William A. Henry, II
Attorney—Walter L. Schlegel, Jr.

[57] ABSTRACT

A device for calibrating an ultrasonic testing machine. A test standard unit including a sleeve holder for an ultrasonic transducer and a standard test specimen is provided. The standard test piece closes one end of the sleeve and is secured to it also. The other end of the sleeve holder is arranged to slidably receive the transducer and hold it spaced at a predetermined distance from the standard test piece defining therebetween a water chamber. The transducer picks up sound signals reflected from the article being tested and converts the sound signal to a visual signal on an oscilloscope.

5 Claims, 4 Drawing Figures

PATENTED JUL 18 1972    3,677,061

Inventor:
Jan Visser

By
Ralph von Faust
Walter L. Schlegel Jr. Attys.

ULTRASONIC TEST STANDARD

In order to ensure that railway car wheels contain no hidden defects such as could cause failure in operation, such wheels are customarily tested ultrasonically by lowering each wheel into a tank of water so that the rim of the wheel is submerged. A sensing head, or transducer, below the surface of the water is aimed at the exterior surface or tread of the wheel. An ultrasonic pulse is generated by the transducer and passes through the water and into the rim of the wheel. The sensing head also receives signals caused by the sound bouncing back from the inner surface of the wheel in the form of an echo. The resultant signal is observed on an oscilloscope and is calibrated for a flawless wheel. A defect in the wheel creates a signal which is immediately discernible on the oscilloscope and the defective wheel is automatically rejected. All of the foregoing is, of course, well known in the art.

The equipment utilized to test wheels in the foregoing manner must, of itself, be periodically tested and checked in order to ensure its accuracy. In this regard, certain standard procedures have been set up by the Association of American Railroads, and include the drilling of a ⅛ inch diameter, flat bottom hole in the tread portion of a railway wheel. The equipment is calibrated by means of this special wheel and the same wheel is utilized to periodically recheck the test equipment. A modification of this standard procedure permits a hole to be drilled from the side of the wheel whereby the ultrasonic signal will be reflected from the side of the drilled hole. The disadvantage of the foregoing test procedures is that this specially prepared wheel must be inserted into the production line of the wheel making plant. The line operator must then wait for this special wheel to arrive at the test station and then proceed with the calibration of the ultrasonic device, thereby disrupting the production line. Furthermore, with the wheel in the test position at the ultrasonic testing station of the production line, it is difficult for an operator to adjust the transducer in order to align it.

It is an object, therefore, of the present invention, to provide a compact, portable device for checking and calibrating ultrasonic testing equipment.

Another object is to provide an ultrasonic testing standard whereby the equipment may be calibrated and checked prior to assembly of the transducer into an ultrasonic testing tank in the production line of objects, for example railway car wheels, which are to be tested ultrasonically for defects.

By means of the present invention, it is possible to check the entire ultrasonic testing system, except for final alignment of the crystal, before the crystal is mounted in the tank in the assembly line. The test standard is advantageous not only for setting up equipment but also for periodically checking out equipment without disruption of production. The advantage of the present device is that it can be used in immersion testing with very little set up time either while immersed at the testing site or in the laboratory, and can also be used outside of a tank without the need for immersion.

Other objects and advantages will be apparent from the following description and accompanying drawings wherein.

Figure 1:
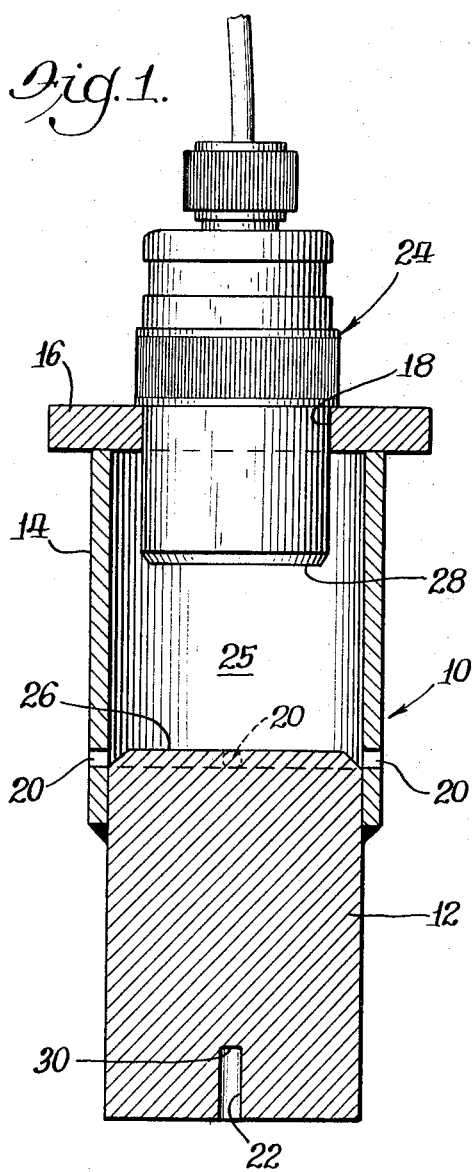
FIG. 1 is a sectional view taken on the vertical axis of the preferred embodiment of the ultrasonic test standard.

Referring now to the drawings and particularly FIG. 1, the test standard is shown generally at 10 as comprising a standard test piece 12 associated with a sleeve 14. The test piece 12 is fabricated from the rim section of a cast steel railway wheel including part of the wheel tread surface. The standard test piece is firmly secured to the end of the sleeve 14 and sealed to prevent water leakage.

The sleeve 14, preferably aluminum or teflon, is preferably formed with an end plate 16 having an opening 18 arranged to receive a transducer 24. The sleeve is provided with vent holes 20 to accommodate escape of air and entry of water when the device is immersed in the ultrasonic test tank. The vent holes must, of course, be plugged when the sleeve is intended to be filled with water and utilized outside of a tank. The standard test piece 12 preferably is provided with a flat bottom hole 22, such hole being on the axis of the sleeve and of the transducer when such is assembled into the sleeve for test purposes.

The transducer 24 is snugly insertable into the opening 18 of the plate 16 so that the outer face 28 of the transducer is parallel not only with the face 26 of the standard test piece but also with the flat bottom 30 of the standard test hole 22. When so assembled, the various elements of the device form a water chamber 25 which is required to carry the ultrasonic test signal.

One of the unique features of the particular arrangement is the ability to manipulate the search unit in such a way that the active portion or crystal of the search unit can be positioned in the best manner relative to the flat bottom hole of the test specimen. This can be accomplished simply by moving the search unit relative to the hole until the greatest response is shown on the oscilloscope.

Figure 2:
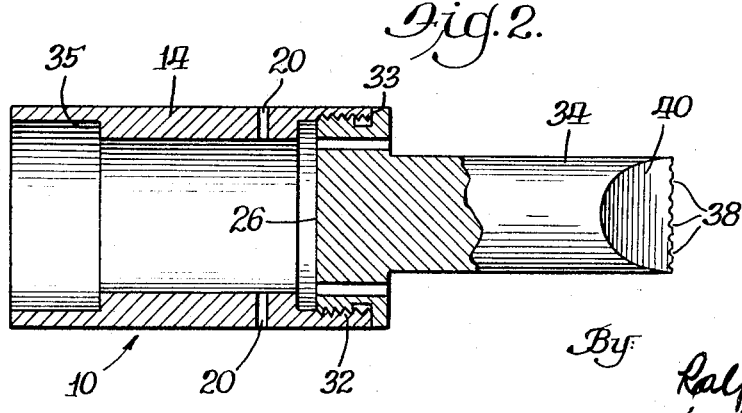
FIG. 2 is a sectional view of an alternate embodiment of the invention showing a modified sleeve and a modified test piece.

Referring now to FIG. 2, an alternate form of test standard includes a sleeve 14 into which a standard test piece 34 may be threaded as at 32 into one end of the sleeve. The test standard is threaded into the sleeve until it abuts shoulder 33. The transducer containing the crystal is inserted into the opposite end of the sleeve until it abuts a shoulder 35, thus assuring a uniform water path distance in every instance.

Figure 3:
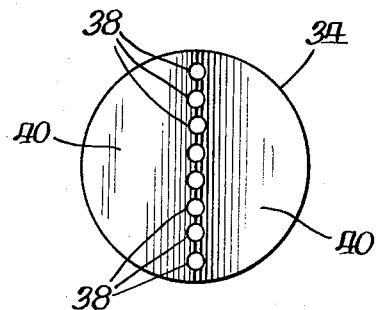
FIG. 3 is an end view of the test piece of FIG. 2 illustrating the arrangement of standard test holes.
Figure 4:
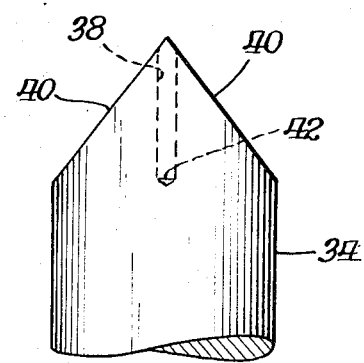
FIG. 4 is a partial side view of the modified test piece of FIG. 3.

The test piece in this embodiment, while still fabricated from a portion of a steel railway car wheel, is provided with a plurality of 1/16 inch diameter holes 38 drilled along a line passing through the center of the test piece, as shown in FIG. 3, to a depth where the hole bottoms are a predetermined distance, in this instance 2 inches, from the entrance face of the test specimen. The particular feature of this arrangement is that the test specimen can be rotated on the search unit so that an off-center characteristic of the search unit will always be lined up with an equal number of holes and thereby produce a uniform sound reflection independent of the particular search unit used. The bottoms 42 of the test holes can be altered to provide any reflecting surface desired, such as sharp pointed rather than flat, and the response can be compared to a master standard and therefore ensure uniform performance of equipment and uniform inspection at various plants. Tapering the end of the test piece into a wedge shape as indicated at 40, in some instances aids in preventing unwanted back reflection signals but this is not essential to the operation of the device. If the wedge shape is utilized, the plurality of test holes are aligned along the apex of the wedge. The 1/16 inch test holes are given by way of illustration only, but may be of different size for other applications.

I claim:

1. A device for calibrating an ultrasonic testing machine of the type wherein a transducer picks up sound signals reflected from an article being tested and converts the sound signal to a visual signal on an oscilloscope, the device comprising: a sleeve, a standard test piece closing one end of the sleeve and secured thereto, the test piece having a reference standard hole at the end remote from said sleeve, the other end of said sleeve being arranged to slidably receive the transducer and hold it spaced at a predetermined distance from the standard test piece to define therebetween a water chamber.

2. A device according to claim 1 wherein one or more air vent holes are provided in said sleeve.

3. A device according to claim 1 wherein the transducer and the test piece have facing surfaces which with the sleeve form said water chamber, said surfaces being parallel with each other and with the bottom surface of the reference standard hole.

4. A device according to claim 1 wherein the end of the standard test piece remote from the sleeve is provided with a plurality of reference holes of uniform depth and diameter.

5. A device according to claim 4 wherein said remote end of the standard test piece is wedge shaped, and the reference holes are aligned along the apex of the wedge.

* * * * *